June 12, 1951            D. SKLARSKY            2,557,014

APPARATUS FOR MOLDING DOLL COMPONENTS

Filed Feb. 7, 1947            2 Sheets—Sheet 1

INVENTOR
DANIEL SKLARSKY
BY
ATTORNEY

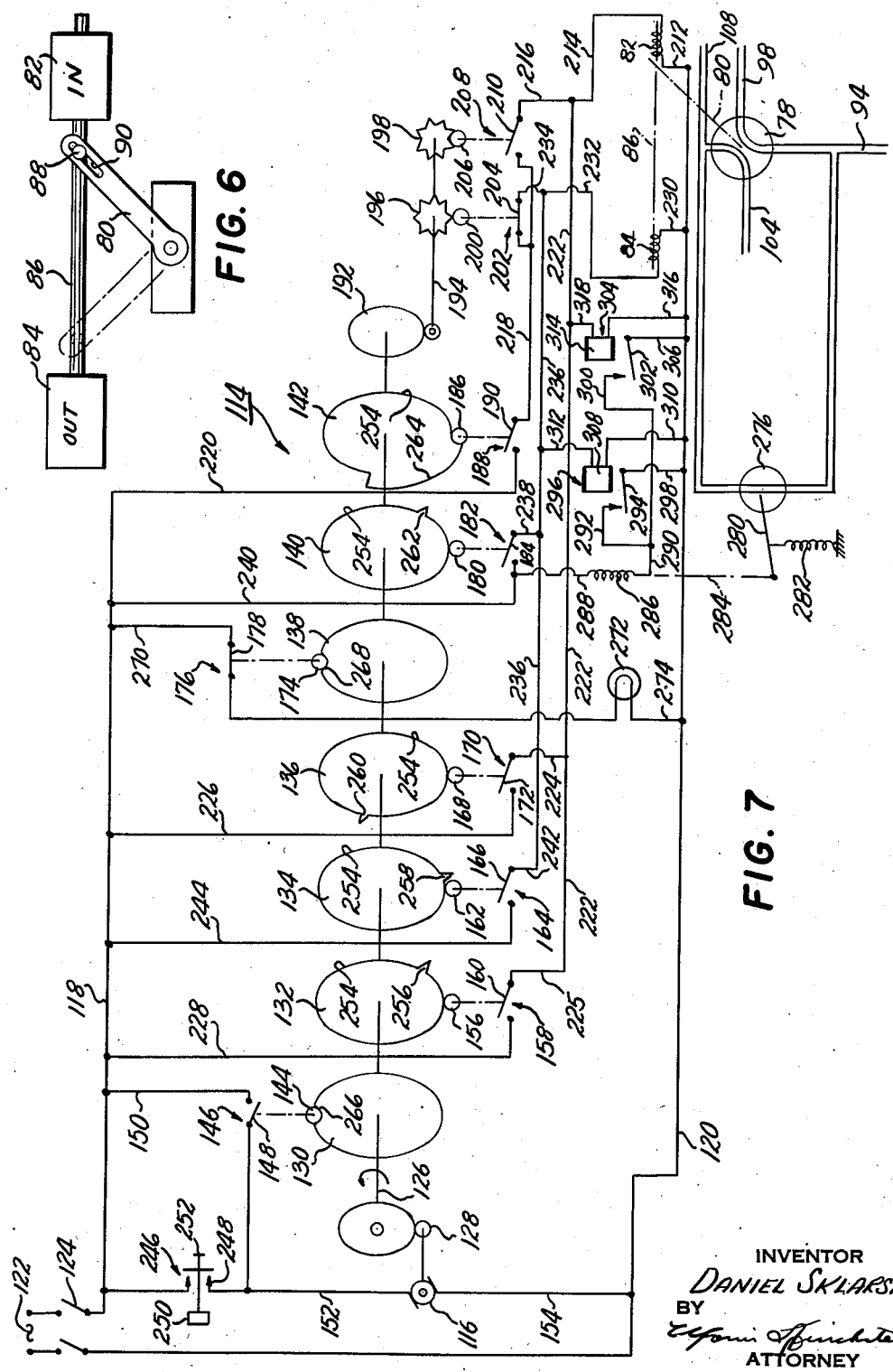

Patented June 12, 1951

2,557,014

UNITED STATES PATENT OFFICE 2,557,014

APPARATUS FOR MOLDING DOLL COMPONENTS

Daniel Sklarsky, Brooklyn, N. Y.

Application February 7, 1947, Serial No. 727,251

5 Claims. (Cl. 18—17)

This invention relates to a means for molding objects.

The actual apparatus shown and described in the instant application is specifically designed for use in the molding of doll components, but it is to be understood that this embodiment of the invention is given by way of example only and is not to be interpreted as limitative except to the extent that features thereof are included in the appended claims.

More particularly the invention pertains to apparatus for molding objects wherein the material to be molded is placed on one of a pair of mold plates while the plates are spaced apart and thereafter the plates are moved into proximity by one mechanism and subsequently pressed together by another mechanism.

It is an object of the present invention to provide apparatus of the character described wherein the pressing mechanism is power driven, rather than manually actuated.

It is another object of the invention to provide apparatus of the character described wherein the pressing mechanism is hydraulically operated.

It is a further object of the invention to provide apparatus of the character described wherein the pressing mechanism is automatically and cyclically operated and wherein at the end of a molding operation the mold plates are left in spaced apart position.

More specifically, the present invention deals with apparatus adapted to mold a material which liberates vapor during the molding process and which vapor must be released from time to time in order to prevent deformation of the molded product.

Pursuant to the instant invention such release is accomplished automatically, it being an object of the invention to provide apparatus of the character described wherein the plates are slightly moved apart at predetermined intervals during the molding cycle in order to permit vapor to escape.

It is yet another object of the invention to provide apparatus of the character described in which the entire molding operation, after the two mold plates have been brought into proximity, is carried out automatically, that is to say, wherein the automatic operation includes pressing the plates together, releasing pressure at predetermined intervals to allow vapor to escape and opening up the plates after the molding operation is completed.

It is yet another object of the invention to provide apparatus of the character described wherein the molding plates are operated hydraulically by a mechanism which permits a plurality of molding presses to be run from a single hydraulic pump so that installation costs and running expenses will be moderate.

Other objects of the invention will in part be obvious and in part hereinafter pointed out.

The invention accordingly consists in the features of construction, combinations of elements and arrangements of parts which will be shown in the accompanying construction and of which the scope will be indicated in the appended claims.

In the drawings in which one of the various possible embodiments of the invention is shown, Fig. 1 is a perspective and partially schematic view of an apparatus constructed in accordance with the present invention;

Fig. 6 is a top view of the hydraulic control lever and the electromagnetic means for operating the same; and Fig. 7 is an electrical circuit diagram for the apparatus.

Figure 1:
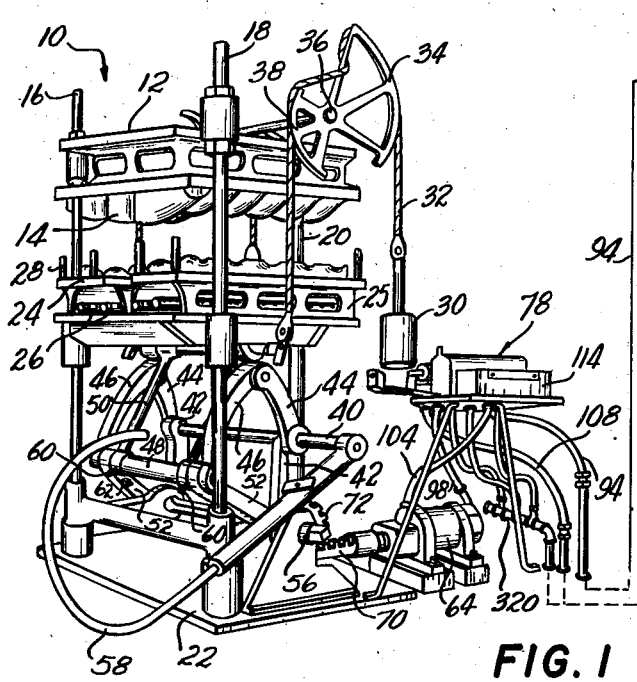

Referring now in detail to the drawings, 10 denotes a molding press embodying the present invention. Said press comprises a head 12 on which is mounted a stationary mold plate 14 whose undersurface has a configuration of the proper shape to impart the desired outline to a plurality of certain components, such for instance, as dolls' heads, torsos, legs or arms. The head 12 is rigidly adjustably secured to three vertical posts 16, 18, 20 suitably fixed to the bed 22 of the press. A lower mold plate 24 is carried by a platen 25 which is slidable on the three posts 16, 18, 20. The upper surface of the plate 24 likewise is of the proper configuration to impart the desired contour to the components that are to be molded.

Quite commonly, material which is molded under pressure also has to be subjected to heat and, to render the machine capable of operating in such fashion, a suitable heating means may be incorporated. Said means, as illustrated herein, is associated with the platen 25 and comprises a plurality of gas burners 26 connected to a source of illuminating gas by flexible conduits (not shown). Pilot pins 28 extend upwardly from the lower mold plate and are adapted to be slidably received in sockets in the upper mold plate before said plates are pressed together in order that accurate registration of the individual mold elements may be assured.

The weight of the platen and mold plate 25 may be substantially offset by a counterpoise 30 suspended on a cable 32 wrapped about a curved track 34 fixed to a rotatable shaft 36. Another track 38 of lesser radius, also fixed to said shaft, is connected by a different portion of the cable to the platen 25. This arrangement acts to amplify the weight of the counterpoise.

Figure 5:
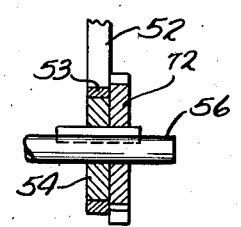
Fig. 5 is a fragmentary sectional view taken across the press shaft and is illustrative of the mechanism for moving the lower plate toward and away from its pressing position.
Figure 2:
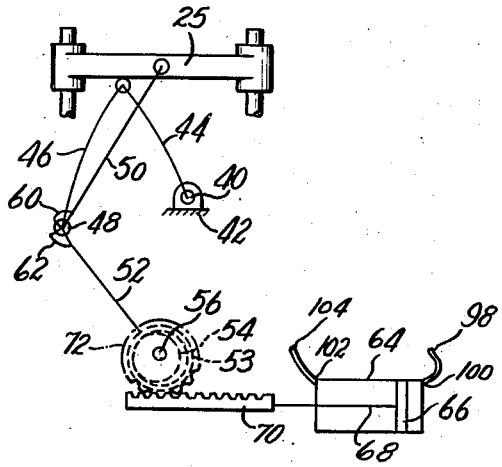
Fig. 2 is a schematic view of the elements for vertically moving the lower shiftable mold plate, said elements being shown in the position they occupy when the aforesaid plate is farthest from the stationary upper plate.

When the press is idle, as shown in Figs. 1 and 2, the upper and lower mold plates are spaced apart widely in order that material to be molded or objects to be pressed can easily be placed therebetween. Means is provided rapidly to move said plates into proximity when it is desired to operate the machine. Such means comprises a horizontal shaft 40 beneath the platen 25 and rotatably supported on a pair of erect spaced pedestals 42. Said shaft has affixed thereto a pair of radius arms 44 each of which has an end of a link 46 pivotally connected to its outer end. The other end of each link is rotatably secured to a counter shaft 48. A pair of parallel rods 50 are rotatably mounted at their lower ends on said counter shaft and are pivotally attached at their upper ends to the platen 25. Another pair of rods 52 have their upper ends rotatably secured to the counter shaft and their lower ends 53 pivotally journaled on cams 54 (see Fig. 5) affixed to a press shaft 56. Said cams 54 are of circular outline and are identically offset with respect to the press shaft.

The rods 50, 52 act as a pair of toggle levers. That is to say, when said levers are moved from their idle angular position shown in Figs. 1 and 2 to their straight line positions shown in Fig. 3, the platen 25 will be moved up into proximity with the head. Such movement is obtained by rotating the shaft 40 in a clockwise direction as viewed from Figs. 1–4. This will cause the radius arm 44 to swing the link 46 and thus pull the counter shaft 48 to the right. The aforesaid rotation of the shaft 40 is accomplished manually by an operator who swings a bar 58 carried by the shaft 40.

Figure 3:
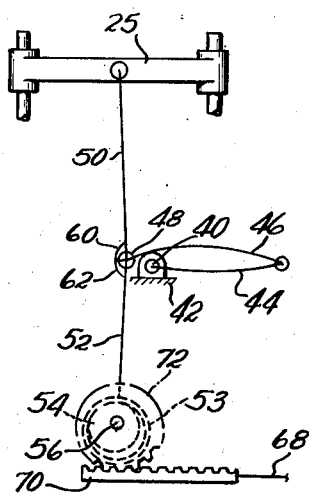
Fig. 3 is a similar view of said elements when the lower plate has been moved into proximity to the upper plate.

Movement of the bar from its idle position shown in Figs. 1 and 2 to its operating position wherein the parts occupy the relative positions shown in Fig. 3 is limited by abutment of the links 46 against the shaft 40. This movement also is limited by abutment of elements on the toggle rods 50, 52. Said elements consist of a pin 60 on each rod 50 and a stop 62 on each rod 52. The pins and stops are so relatively disposed that the pins will rest against the stops shortly after the shaft 48 has crossed an imaginary line connecting the centers about which the upper ends of the rods 50 and the lower ends of the rods 52 turn. With this arrangement the toggle rods will be automatically locked in extended position by the weight of the platen 25 so that, if the lower toggle rods 52 were raised, they would raise the upper toggle rods 50 and the platen 25.

Figure 4:
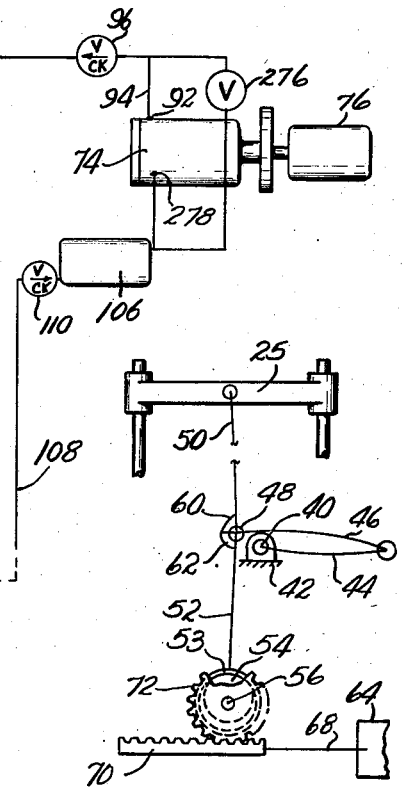
Fig. 4 is a view similar to Fig. 2 of said elements when the lower plate has been moved into pressing position.

The press also includes means to raise said lower toggle rods in such manner as to press the platen against the head. It may be mentioned that the heretofore described linkage for raising the platen from idle position to partially closed position is not used for pressing because said linkage does not have a sufficiently large mechanical advantage. The means for pressing the platen against the head includes the cams 54 and the press shaft 56 already mentioned. These cams, on which the lower ends of the toggle rods 52 are journaled, are eccentrically disposed with respect to the press shaft, being so arranged that when the machine is idle the cams are offset downwardly from the shaft. This arrangement permits the lower toggle rods to be raised by turning the press shaft after the toggle rods have been shifted to their extended position. Thus, rotation of the press shaft will raise the platen 25 as indicated in Fig. 4.

Pursuant to the present invention the press shaft is turned by hydraulic means. Said means comprises a cylinder 64 in which a plunger 66 is reciprocatable. The plunger is connected to a shaft 68 which is attached to a rack gear 70 in mesh with a pinion 72 fixed to the press shaft. The plunger 66 has a length of stroke equal to about one half the pitch circumference of the pinion 72 so that when said plunger is moved from the position indicated in Fig. 3 to that indicated in Fig. 4 it will turn the pinion 72 through about 180° which will raise the platen 25 to its pressing position. Thus, simply by shifting the plunger 66 back and forth in the cylinder 64 the platen can be raised or lowered.

Said plunger is moved in the cylinder by a substantially incompressible liquid, such as oil, under pressure which may be supplied from a hydraulic gear pump 74 operated by an electric motor 76. The pump is connected to the hydraulic cylinder 64 through a valve 78 (Figs. 1, 6 and 7) and a plurality of conduits. Said valve is of conventional construction and is such that when in one position it will connect one side of the plunger 66 to pressure and the opposite side to drain and in the other position will connect the opposite side of the plunger to pressure and the first mentioned side to drain. Said valve is operated by a handle 80 movable between two extreme positions, in one of which it will cause the plunger 66 to be thrust toward the shaft 56 and in the other of which it will retract said plunger from the shaft. It will be understood that the valve handle may be operated by hand and that this simple form of the invention will obviate the necessity of having a man exert himself to turn the shaft 56 under the high temperature prevailing because of the burners 26.

However, pursuant to a further feature of the invention, the valve handle 80 is moved back and forth during a molding cycle automatically so to obtain a uniform product. Said handle is actuated electromagnetically by a pair of opposed solenoids 82, 84 having a common armature 86 carrying a pin 88 slidably receivable in a slot 90 formed in the handle 80. Energizing the solenoid 82 will pull the handle 80 to a position in which the connections within the valve 78 will provide a path from the high pressure outlet 92 of the pump 74 through a conduit 94, a check valve 96, the valve 78, and a conduit 98 to a port 100 at the far side of the cylinder 64. Oil is drained from the cylinder through a port 102 at the near side of the cylinder. This port is connected by a conduit 104 to the valve 78 which directs the draining oil to a reservoir 106 through a conduit 108 and check valve 110. When the solenoid 84 is energized and the solenoid 82 de-energized oil will be forced at high pressure from the pump 74 through the check valve 96, conduit 94, valve 78 and conduit 104 to the inlet port 102. At this time oil will drain from the port 100 through conduit 98 and valve 78 to the reservoir 106.

The foregoing press is designed to employ a material which will liberate gas when heated, a typical molding material constituting sawdust, rosin and starch mixed together with water. If the molds are simply pressed together and left to bake, the gas (steam) liberated will form voids in the molded part, causing either a local thinning of the part or leaving a hole through it. To prevent this, it has been the practice for an operator to lightly press the two mold plates together and then release them so as to allow the steam to escape, this operation being repeated a few times at irregular short intervals depending upon the operator's judgment. Subsequently the plates were brought together for a longer period and then once again opened to let steam out. Finally the plates were pressed together long enough for the parts to bake hard. Parts manufactured according to this procedure often were so defective that they could not be accepted.

Pursuant to another feature of the present invention, the two mold plates are brought together automatically at predetermined intervals by a cycling mechanism 114 (Figs. 1 and 7) which controls the electromagnets 82, 84. Said cycling mechanism comprises a self-starting synchronous motor 116 energized from low tension power lines 118, 120. These lines are connected to a source of electrical energy 122 by a double pole single throw switch 124. The motor 116 drives a shaft 126 through a reduction gear train 128. The shaft 126 carries a plurality of cams 130, 132, 134, 136, 138, 140 and 142, the purpose of each of which will now be pointed out.

The cam 130 is engaged by a follower 144 mounted on the actuating element of a momentary electric switch 146 having a pair of normally open contacts 148. One of the contacts 148 is connected to the line 118 by a wire 150. The other of the contacts 148 is connected to one side of the motor 116 by a wire 152 and a wire 154 runs from the other side of the motor 116 to the line 120.

The cam 132 is engaged by a follower 156 mounted on the actuating element of a momentary switch 158 having a pair of normally open contacts 160. The cam 134 is engaged by a follower 162 mounted on the actuating element of a momentary switch 164 having a pair of normally open contacts 166. The cam 136 is engaged by a follower 168 mounted on the actuating element of a momentary switch 170 having a pair of normally open contacts 172. The cam 138 is engaged by a follower 174 mounted on the actuating element of a momentary switch 176 having a pair of normally closed contacts 178. The cam 140 is engaged by a follower 180 mounted on the actuating element of a momentary switch 182 having a pair of normally open contacts 184. The cam 142 is engaged by a follower 186 mounted on the actuating elements of a momentary switch 188 having a pair of normally open contacts 190.

The shaft 126 also carries a stepup gear train 192 which turns a shaft 194 on which are mounted a pair of star wheels 196, 198 so relatively arranged that the points of each are registered with the valleys of the other. The star wheel 196 is engaged by a follower 200 mounted on the actuating element of a momentary switch 202 having a pair of normally open contacts 204 (shown in operated condition in Fig. 7). The star wheel 198 is engaged by a follower 206 mounted on the actuating element of a momentary switch 208 having a pair of normally open contacts 210.

The "in" electromagnet 82 (so called because when it is energized it will cause the plates to be pressed together) is connected by a wire 212 to the line 120. Said magnet may be connected to the line 118 through several paths as follows: (a) from the magnet 82 through wires 214, 216, the normally open contacts 210 of the switch 208, a wire 218, the normally open contacts 190 of the switch 188 and a wire 220; (b) from the magnet 82 through wire 214, wires 222, 224, the normally open contacts 172 of switch 170 and a wire 226; and (c) from the magnet 82 through wire 214, 222, 225, the normally open contacts 160 of the switch 158 and a wire 228.

The "out" electromagnet 84 is connected by a wire 230 to the line 120. Said magnet may be connected to the line 118 through several paths as follows: (a) from the magnet 84 through wires 232, 234, the normally open contacts 204 of the switch 202, the wire 218, the normally open contacts 190 of the switch 188 and the wire 220; (b) from the magnet 84 through wires 232, 236, 238, the normally open contacts 184 of the switch 182 and a wire 240; and (c) from the magnet 84 through wires 232, 236, 242, the normally open contacts 166 of switch 164 and a wire 244.

The cycling mechanism 114 also includes means to start the same in operation. Said means includes a starting switch 246 which includes a pair of normally open contacts 248 and a time delay mechanism 250. Said time delay mechanism may be of any type and is so constructed that when the button 252 of the switch is pushed to close the contacts 248, these contacts will be kept closed for at least a few seconds, say 15 seconds, but for a period of time less than a complete cycle which may take about seven minutes.

Each of the cams 132, 134, 136, 140 and 142 mainly comprises a dwell surface 254, that is to say, a surface such that during the greater part of a single revolution of the shaft 126, each cam will be ineffective to actuate the contacts of its associated switch. Each said cam also includes a lobe which is designed to actuate the associated switch. These lobes are provided as follows: A narrow lobe 256 on the cam 132, a narrow lobe 258 on the cam 134, a narrow lobe 260 on the cam 136, a narrow lobe 262 on the cam 140 and an extended lobe 264 on the cam 142. These lobes are designed to actuate at predetermined and different angular positions of the shaft 126 the sundry switches 158, 164, 170, 182, 188 associated with said cams. The cam 130 has a notch 266 and the cam 138 a notch 268 which engage the followers 144 and 174, respectively, when the shaft 126 is in its initial or idle position. The balance of the surface of each of said cams is an effective or operating portion which will move the associated cam follower to switch actuating position.

The various lobes and notches 256—268 are arranged as follows: When the cycling apparatus is idle the followers 144 and 174 are in notches 266, 268. At the same time the follower 186 associated with the cam 142 is immediately adjacent the extended lobe 264 of cam 142 so that as soon as the cycling mechanism is started said follower will ride up on this lobe. As illustrated, the lobe 264 covers about 100°, it being understood that the specific angular span of this lobe and of the angular position of all of the lobes is set forth only by way of illustration and is not to be construed as limitative. The lobe 260 of cam 136 is so angularly disposed that it will engage its follower 168 as the lobe 264 permits its follower 186 to return to deactuated position. The lobe 260 and, indeed, all the remaining lobes whose position is hereinafter described cover very short angular spans. The next lobe in angular sequence is the lobe 262 of the cam 140. Said lobe is about 200° away from the lobe 260. The next succeeding lobe is the lobe 256 of the cam 132 which engages its follower 156 about 8° after the lobe 262 releases its follower 180. It may be mentioned here that the critical portions of the lobes insofar as the angular measurement is concerned are the apices thereof, these being the portions which when they engage the followers will cause the associated switch contacts to be operated. The last lobe to engage a follower is the lobe 258 of the cam 134. This lobe is about 51° away from the lobe 256.

The star wheels 196, 198 each have eight teeth and the step up ratio of the gear train 192 is about three to one so that successive teeth on the same star wheel will actuate their followers every 15° of rotation of the shaft 126 and a peak on one star wheel will actuate its follower after a peak on the other star wheel has actuated its follower every 7½° of revolution of the shaft 126.

To start operation of the press the button 252 of the switch 246 is depressed. This energizes the self-starting synchronous motor 116 which immediately begins turning the shaft 126. Within the first few degrees of rotation of said shaft, the follower 144 will leave the notch 266 in the cam 130 whereby to close the normally open contacts 148 of the switch 146 and form a circuit bypassing the starting switch 246. The time delay mechanism 250 is of such character that it will hold the contacts 248 bridged during the short time necessary for the cam follower 144 to close the contacts 148.

As soon as the shaft begins to turn, the extended lobe 264 of the cam 142 will engage the cam follower 186 thereby causing the normally open contacts 190 of the switch 188 to close. This action will connect the line 118 to the wire 218 so as to supply power to a local circuit for energization of the solenoids 82, 84 through operation of the star wheels 196, 198. Rotation of the shaft 126 causes the shaft 194 on which the star wheels are mounted to turn. As already noted, said star wheels are so relatively arranged that they will alternately close the normally open contacts of the switches 202, 208. When the contacts of switch 202 close (the switch 188 being closed), the "out" solenoid 84 will be energized and when the contacts of switch 208 are closed they will energize the "in" solenoid 82. Thus, rotation of the shaft 126 over the first 100° of its travel will alternately cause the "in" and the "out" solenoids to be energized. As a result the lower mold plate 24 first will be pressed against the upper mold plate 14 for a short period of time and said lower plate then will be moved down away from the upper plate for a short period of time, this action being repeated at regular intervals. With the mentioned overall cycle time of seven minutes and the illustrated number of teeth on the star wheels, the short opening and closing cycle will repeat every eighteen seconds. Opening and closing of the mold plates at short intervals will heat and compress the molding composition and then permit the generated steam to escape. This period of operation i. e. while the lobe 264 is effective, may be referred to as the "steaming" period.

It should be observed that the frequency and number of cycles in the steaming period can be changed to suit the particular requirements of any given molding composition as well as the amount of such composition which is used for any specific component, the mentioned steaming cycles being given by way of illustration only. Thus, with more water in the composition the steaming cycles may be of shorter duration, for example seven seconds each, and the number of steaming cycles increased, e. g. to cover two minutes or more instead of 116.5 seconds which corresponds to 100° of shaft rotation with an overall cycle time of seven minutes.

As soon as the shaft 126 has turned sufficiently to cause the lobe 264 to leave its cam follower 186, the lobe 260 of cam 136 will engage its cam follower 168 to momentarily close the normally open contacts of the switch 170, thereby energizing the "in" solenoid 82. After the lobe 260 leaves its cam follower 168, neither solenoid is energized for a substantial period of time, so that the molding composition will be left to bake until the lobe 262 of cam 140 engages its cam follower 180 two hundred degrees after the lobe 260 leaves it cam follower 168. This angular period will provide a baking time of about 233 seconds, it being understood that the same can be enlarged or diminished as desired. When the lobe 262 becomes effective it will close the normally open contacts of switch 182 to energize the "out" solenoid so that the mold plates will be moved apart to permit the escape of steam which has accumulated during baking.

Only little time is needed to allow this steam to leave, so that shortly after actuation of the switch 182 the lobe 256 of cam 132 will engage its cam follower 156 to close the contacts of switch 158 which will cause energization of the "in" solenoid and resumption of baking. The duration of the second baking period may be shorter than that of the first and is herein shown as about 59.5 seconds. The second baking period terminates when the lobe 258 of cam 134 engages its cam follower 162 to close the contacts of switch 164 and energize the "out" solenoid.

By this time the time delay mechanism will have permitted the contacts 248 of the starting switch to open. As the shaft continues to turn it will reach its initial position in which the cam follower 144 falls into the notch 266 of cam 130, thus opening the circuit bypassing the starting switch and cutting off power to the motor 116. Thereupon the shaft 126 will come to rest with the molding plates slightly spaced apart. At the same time the cam follower 174 will drop into the notch 268 of cam 138 so as to allow the contacts 178 to close. Closure of said contacts will complete a circuit from line 118 through a wire 270, a lamp 272 and a wire 274 to line 120, thus energizing said lamp so as to give a visual signal which will indicate to the operator that the machine is idle.

It will be apparent that the foregoing alternate energizations of the "in" and "out" solenoids will close and open the mold plates as long as a source of liquid under pressure is available and that, therefore, the invention may be practiced with the pump 74 continuously supplying pressure. However, the system desirably may be so arranged that, although the pump runs continually, it need only supply pressure intermittently and in this manner the same pump may be used to actuate several presses of the foregoing character without requiring the presence of any large source of oil under pressure. Desirably, this result is accomplished by providing a bypass valve 276 between the high pressure outlet 92 and the return inlet 278 of the pump. When this by-pass directly connects the high pressure and return sides of the pump, the pump will run under a no load condition. However, when the bypass is closed, oil under pressure will be forced through the check valve 96 to whichever side of the cylinder 64 the valve 78 may be connected. The bypass valve 276 is provided with a handle 280 which normally is biased by a tension spring 282 to a position in which said valve is in the no load condition indicated in Fig. 7.

The circuit controlled by the cycling mechanism is so arranged that said bypass valve will be actuated to be moved from its no load condition for a short period of time following the energization of either the "in" or "out" solenoid, this period of time being sufficiently long to permit the piston 66 to either open or close the molding plates. To this end, the bypass valve handle 280 is operated by an armature 284 associated with a solenoid 286. Said solenoid has one side thereof permanently connected to the line 118 through wires 288, 240. The other side of the solenoid 286 may be connected to the line 120 through either one of two circuits to wit: (a) wires 290, 292, normally open contacts 294 of relay 296 and wire 298; and (b) wires 290, 300, normally open contacts 302 of relay 304 and wire 306. The operating coil 308 of relay 296 has one side thereof connected by a wire 310 to the line 120 and the other side thereof connected by a wire 312 to the wire 236. It will be remembered that the wire 236 is connected to the line 118 every time that the "out" solenoid 84 is energized, and for the period of energization of said solenoid, so that the bypass valve 276 will be actuated throughout the time that the "out" solenoid is in operation. The coil 314 of relay 304 is connected to the line 120 and to the wire 222 by wires 316, 318 respectively so that the bypass valve will be actuated during the period of energization of the "in" solenoid as well as during the period of energization of the "out" solenoid.

The period of energization of the "in" and "out" solenoids is determined by the steepness of the lobes 256—262 and the teeth of the star wheels 196, 198, and by the disposition of said lobes and teeth relative to the momentary switches which they control. This disposition is so arranged that each time one of the switches which covers the energization of an "in" and "out" solenoid is actuated, the switch will stay actuated long enough, e. g. 1½ seconds, to close or open the mold plates. Thereafter as soon as the switch opens and the "in" or "out" solenoid is deenergized, the bypass valve will return to its no load condition in which the pump is running freely. Pressure is maintained in the high pressure lines by the check valve 96 and no pressure can be built up in the return lines because of the check valve 110. Some slight leakage occurs at various points in the valve 78 and the leakage fluid is returned through conduits 320 to the reservoir 106.

After the cycling mechanism has completed one full cycle and the lamp 272 is lit, an operator will pull back the bar 58 to fully open the mold plates and permit the molded parts to be removed and a fresh batch of molding composition to be inserted.

It will thus be seen that there are provided devices which achieve the several objects of this invention and are well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described the invention, there is claimed as new and desired to be secured by Letters Patent:

1. A molding apparatus for molding doll components under heat and pressure from a molding composition which releases steam when heated, said apparatus comprising a pair of mold plates, means to heat said mold plates, means to stationarily support one of said plates, means to guide the other plate for linear movement toward and away from said first plate, a linkage system for linearly shifting the movable plate between two positions in one of which it is remote from the stationary plate and in the other of which it is near said stationary plate, the portion of said linkage system which shifts said movable plate constituting a pair of links pivotally joined to one another, said links being angularly disposed with respect to their point of pivotal attachment when said movable plate is remote from said stationary plate and forming substantially a straight line when said movable plate is near said stationary plate, means to mount said links for movement as a whole toward and away from said stationary plate, said means including a press shaft, a pinion on said press shaft, a rack gear, a cylinder in which said plunger is reciprocable, a source of incompressible liquid, means to place said liquid under pressure, a valve to selectively connect said source to either end of said cylinder, the stroke of the plunger not exceeding one half of the pitch circumference of said pinion, electromagnetic means to operate said valve, and a cycling mechanism to control the operation of said electromagnetic means, said cycling mechanism including two shafts, means to drive one of said shafts at a certain speed and the other of said shafts at a greater speed, switch means associated with said second shaft, switch means associated with said first shaft, said switch means being series connected between a source of electric energy and said electromagnetic means, means on the second shaft to intermittently actuate the switch means associated therewith throughout an entire revolution of the second shaft, means on said first shaft to render the switch means associated therewith operable to connect the second-named switch means to the source of electric energy over a portion of the rotation of the first-named shaft, another switch means associated with the first-named shaft and connecting said electromagnetic means to said source of electric energy, and another means associated with said first shaft for controlling the operation of the last-named switch means during the subsequent portion of the rotation of the first-named shaft.

2. An apparatus as set forth in claim 1 wherein means is provided to actuate the means for placing the liquid under pressure for a short period of time only each time the electromagnetic means is operating.

3. An apparatus as set forth in claim 1 wherein the means on the first-named shaft for operating the various switch means comprises a plurality of cams for controlling the operation of the switch means actuated during the remaining portion of the rotation of the first-named shaft, said cams all having short angular actuating portions and another cam on said first-named shaft for controlling the operation of the switch means in series with the switch means associated with the second shaft, said last named cam having a long angular actuating portion whereby the electromagnetic means is intermittently operated several times by the second shaft during each cycle of operation of the apparatus.

4. A molding apparatus for molding doll components under heat and pressure from a molding composition which releases steam when heated, said apparatus comprising a pair of mold plates, means to heat said mold plates, means to stationarily support one of said plates, means to guide the other plate for linear movement toward and away from said first plate, a linkage system for linearly shifting the movable plate between two positions in one of which it is remote from the stationary plate and in the other of which it is near said stationary plate, the portion of said linkage system which shifts said movable plate constituting a pair of links pivotally joined to one another, said links being angularly disposed with respect to their point of pivotal attachment when said movable plate is remote from said stationary plate and forming substantially a straight line when said movable plate is near said stationary plate, means to mount said links for movement as a whole toward and away from said stationary plate, said means including a press shaft, a pinion on said press shaft, a rack gear, a cylinder in which said plunger is reciprocable, a source of incompressible liquid, means to place said liquid under pressure, a valve to selectively connect said source to either end of said cylinder, the stroke of the plunger not exceeding one half of the pitch circumference of said pinion, electromagnetic means to operate said valve, and a cycling mechanism to control the operation of said electromagnetic means so as to move said plates toward and away from each other first for a predetermined number of predetermined short intervals of time, then to press said plates together over a much longer period of time, subsequently to momentarily move said plates apart, next to press said plates together for an appreciable period of time, and finally to move said plates apart and terminate a cycle.

5. A molding apparatus for molding doll components under heat and pressure from a molding composition which releases steam when heated, said apparatus comprising a pair of mold plates, means to heat said mold plates, means to stationarily support one of said plates, means to guide the other plate for linear movement toward and away from said first plate, a linkage system for linearly shifting the movable plate between two positions in one of which it is remote from the stationary plate and in the other of which it is near said stationary plate, the portion of said linkage system which shifts said movable plate constituting a pair of links pivotally joined to one another, said links being angularly disposed with respect to their point of pivotal attachment when said movable plate is remote from said stationary plate and forming substantially a straight line when said movable plate is near said stationary plate, means to mount said links for movement as a whole toward and away from said stationary plate, said means including a press shaft, means to rock said press shaft, a source of incompressible liquid, means to place said liquid under pressure, a valve to selectively connect said source to said rocking means so as to rock the shaft in either a clockwise or a counterclockwise direction, electromagnetic means to operate said valve and a cycling mechanism to control the operation of said electromagnetic means so as to move said plates toward and away from each other for a predetermined number of predetermined intervals of time.

DANIEL SKLARSKY.

REFERENCES CITED

The following references are of record in the file of this patent:

UNITED STATES PATENTS

| Number | Name | Date |
| --- | --- | --- |
| 1,368,836 | Priester | Feb. 15, 1921 |
| 1,640,015 | Waream | Aug. 23, 1927 |
| 1,904,112 | Achard | Apr. 18, 1933 |
| 2,027,165 | Grubman | Jan. 7, 1936 |
| 2,030,986 | Havill | Feb. 18, 1936 |
| 2,160,805 | Winegar | June 6, 1939 |
| 2,211,692 | Ferris | Aug. 13, 1940 |
| 2,215,244 | Linzell | Sept. 17, 1940 |
| 2,222,732 | Winegar | Nov. 26, 1940 |
| 2,269,389 | Weida | Jan. 6, 1942 |